(12) United States Patent
Martin Perianes

(10) Patent No.: US 6,193,097 B1
(45) Date of Patent: Feb. 27, 2001

(54) PORTABLE COOLER

(76) Inventor: Miguel Angel Martin Perianes, Bellavista, 33, 43206 Reus (Tarragona) (ES)

(*) Notice: Subject to any disclaimer, the term of this patent is extended or adjusted under 35 U.S.C. 154(b) by 0 days.

(21) Appl. No.: 09/512,925

(22) Filed: Feb. 25, 2000

(51) Int. Cl.[7] ........................................... A45C 11/20
(52) U.S. Cl. ........................ 220/592.03; 220/23.87; 220/501
(58) Field of Search ........................ 220/501, 915.2, 220/915.1, 23.87, 533, 571, 592.03; 206/514; 210/464; 62/457.7, 457.1

(56) References Cited

U.S. PATENT DOCUMENTS

| | | | |
|---|---|---|---|
| 2,399,787 | * | 5/1946 | Clerc . |
| 2,522,768 | * | 9/1950 | Wiepert . |
| 2,671,239 | * | 3/1954 | Wisner . |
| 2,724,494 | * | 11/1955 | Graff . |
| 3,920,144 | * | 11/1975 | Callen ................................. 220/533 |
| 4,565,074 | * | 1/1986 | Morgan ............................. 62/457.1 |
| 4,955,470 | * | 9/1990 | Hamel et al. ...................... 206/213 |
| 5,135,787 | * | 8/1992 | Bair ................................... 426/124 |
| 5,871,116 | * | 2/1999 | Picchietti ........................... 220/501 |

* cited by examiner

*Primary Examiner*—Stephen Castellano
(74) *Attorney, Agent, or Firm*—Steinberg & Raskin, P.C.

(57) ABSTRACT

Portable cooler comprising a container body of insulating material and provided with a top cover consisting of two areas, top and bottom, the bottom one having a lesser-profile defining a resting edge for an intermediate drilled plate. The top area comprising a plurality of removably compartments for keeping food and/or drinks and the ice, resting on the intermediate drilled plate. At the lower area having a liquid tank receiving liquid defrosting from ice liquefaction through the drilled bottom and the intermediate drilled plate, this liquid tank being provided with a draining hole with the relevant sealing plug.

7 Claims, 2 Drawing Sheets

PORTABLE COOLER

FIELD OF THE INVENTION

This invention relates to a portable cooler.

Portable coolers to keep and preserve cold food and drinks by having ice there are already known in the market, however, when using them, ice liquefaction increases remarkably and the location or removal of food and drinks becomes thus very troublesome.

BACKGROUND OF THE INVENTION

With the portable cooler of this invention, said drawbacks have been overcome and the cooler is provided with a structure separating food and drinks as regards to the ice and facilitates therefore location and removal of food and drinks; the amount of water from the ice liquefaction is also separated and collected at a lower container and the liquefaction speed is thus reduced.

The portable cooler of this invention is of the type comprising two differently-sized parallelepiped bodies inserted one within the other, a thermoinsulating material filler inserted between body and body, and in a quite simpler way a peculiar good-natured main moulding body can also be provided. The cooler having a top cover with the same insulating characteristics or not than the main body and has a carrier handle. The cover is fixed to the main body by conventional sealing means.

OBJECTS AND SUMMARY OF THE INVENTION

The portable cooler of this invention comprises a food and/or drink container body and is provided with a handle-fitted sealing cover; the body comprises a compartment for food and drinks distribution to keep and preserve them at cool temperatures when contacting with cold components; essentially characterized in that the container body comprises a top area defining a plurality of food and/or drinks and ice gathering compartments and a lesser-profiled lower area than the top one making up a lower container for keeping there the liquid from the ice liquefaction and is also provided with a draining hole fitted with a sealing plug, these top and lower parts are separated by an intermediate drilled plate resting on the profiled edge projecting from the lower area and upholding food and/drinks and ice located at the top area.

According to this invention, the compartments for keeping ice there are made up with removably and directed receptacles as regards the inside walls of the container body which are resting on the intermediate drilled place at the bottom side.

According to this invention, the compartments for keeping ice there are made up with removably bottom-drilled tanks arranged between the receptacles for keeping food and/or drinks there and resting on the intermediate drilled plate at the bottom side.

Also according to the invention, the compartments for keeping ice there are defined by the spaces between the compartments for keeping food and/or drinks there, which are made up with directed and removably receptacles resting on the intermediate drilled plate at the bottom side, the ice remaining kept between said receptacles and the same intermediate drilled plate.

According to the invention, the container body top area is upwardly having a double section also upwardly defining an inside perimetral bracket allowing that the flattened containers arranged above the receptacles and/or tanks can be rested quite balanced thereon. Said receptacles and tanks may have a height at the same level as the perimetral bracket enabling the flattened containers to be rested on the receptacles, tank and bracket.

According to the invention, the plurality to food and/or drinks keeping compartments and the ice tank at the top area, are defined by a plurality of removably separating components arranged between the cooler container body sides positionably-able to define equal and/or diverse spaces as might be required.

BRIEF DESCRIPTION OF THE DRAWINGS

These and other characteristics will be more apparent in the following detailed description which is further facilitated by the attached two sheets of drawings illustrating there a practical case of embodiment cited only by way of a non-exhaustive example of the scope of this invention.

In the drawings.

DETAILED DESCRIPTION OF THE INVENTION

Figure 1:
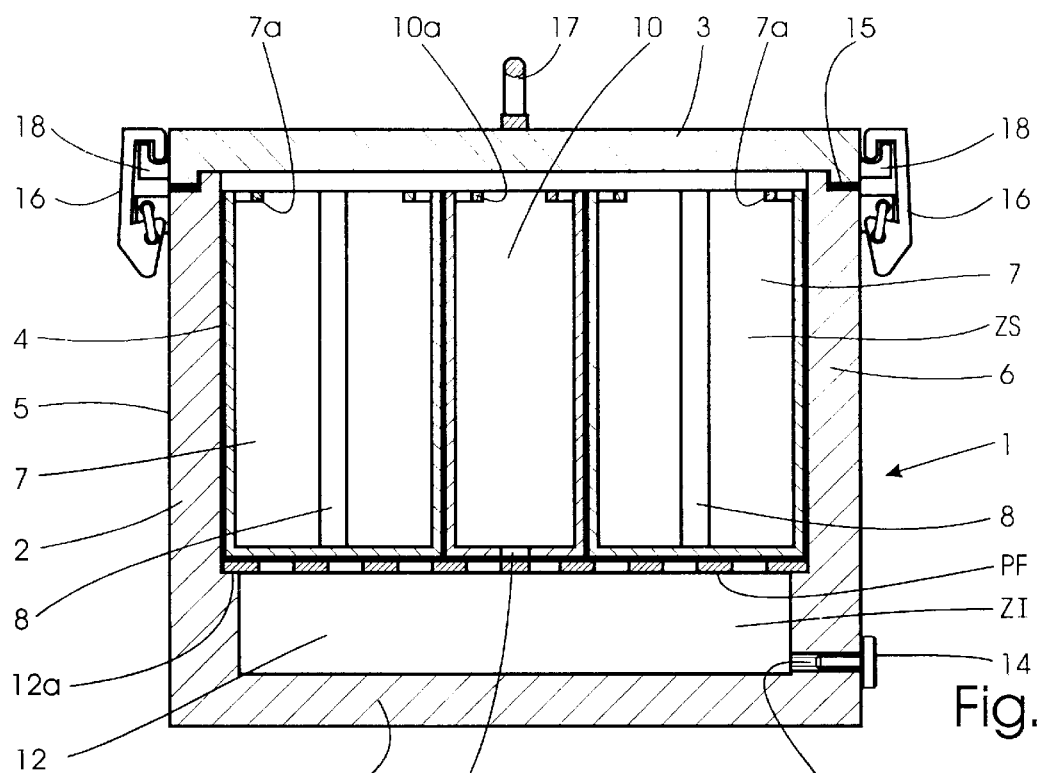
FIG. 1 is an elevation cross-sectional view of the portable cooler of this invention taken along the line I—I of FIG. 2.

According to the drawings, the portable cooler of this invention, identified as numeral reference 1 comprises a main container body 2 and the cover 3.

The main body 2 makes up the proper container body 5, moulded with a plastic material, and a thermoinsulating layer 4 or an intermediate thermoinsulating filler 6 such as an expanded polyurethane or similar may be incorporated to the body inside face.

The main body 2 inside the portable cooler 1, comprises a top area ZS having a plurality of compartments and a lesser-profiled bottom area ZI making up a lower tank 12 for keeping the ice liquefied liquid. Said compartments of the top area ZS defining two receptacles 7 for keeping relevant food and drinks. Said receptacles 7 are removably, i.e. can be removed from the main body 2, and are provided thereby by mutual guiding means consisting of vertical fluttings 8 combined with some supplementary vertical ribs 9 provided at the cooler wall or inside the body 2 and at the receptacles 7; the vertical sliding is thus allowed to perform the removal and facilitates cleaning and hygiene thereof.

Between both side receptacles 7, the main body 2 centrally comprises a removably drilled-bottom ice tank 10 or downwardly provided with a draining hole 11 communicating with the bottom-located liquid tank 12 receiving and keeping the liquid from the ice liquefaction contained in the ice tank 10.

Figure 2:
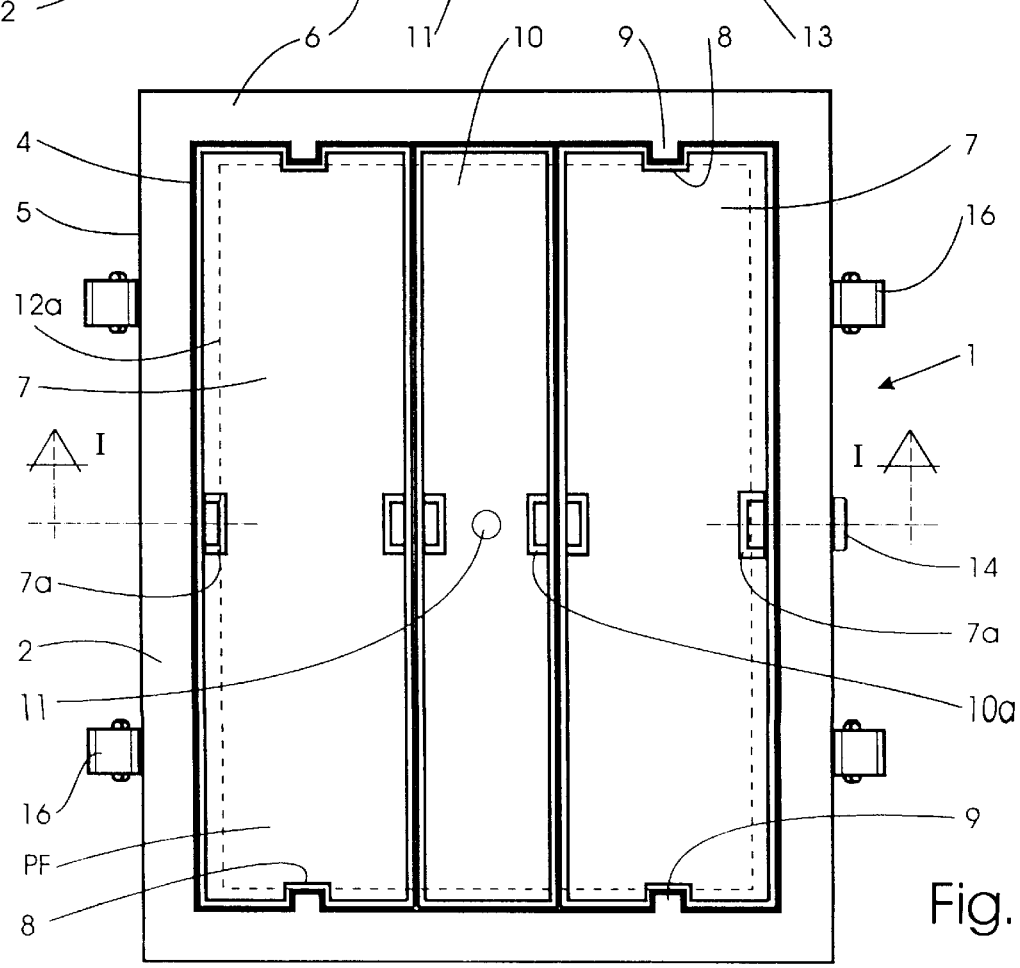
FIG. 2 is a plan view of the portable cooler of this invention with the cover removed.
Figure 3:
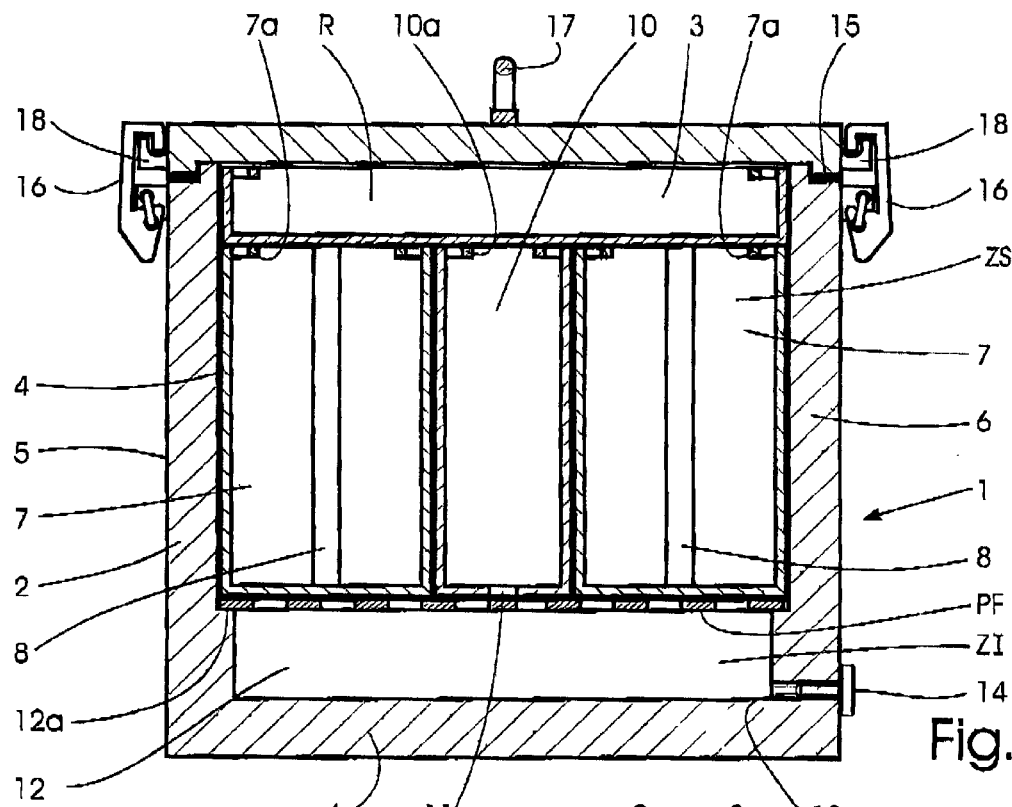
FIG. 3 is an elevation cross-sectional view similar to FIG. 1, showing there an upwardly arranged flattened receptacle resting on the food and/or drinks receptacles and on the ice tank.

As shown in FIG. 1 and FIG. 2 receptacles 7 and tank 10 generally comprise rectangular tubs which are structured and arranged to be inserted within the body of the cooler and rest on top of the drilled plate PF as shown. Each receptacle 7 includes vertical flutes 8 which extend vertically along either end walls of the receptacle and are adapted to be slidably mated with ribs 9 provided on an inner surface of the cooler wall. As shown in FIG. 2, tank 10 is adapted to be placed between the receptacles 7 and rest on top of the drill plate PF.

The lower area ZI has a lesser profile than the top area ZS and defines an edge 12a, whereon a drilled plate PF is resting and the food and/or drinks receptacles 7 and the ice tank 10 are resting on the plate.

Said liquid tank 12 is provided with a draining hole 13 receiving a sealing plug 14 to control the liquid draining.

As can be seen in the figures, particularly in FIG. 2, the structure of the portable cooler 1 of this invention is providing a maximum contact surface between the cold walls of the ice central tank 10 and the walls of the side receptacles 7 keeping food and drinks and the ice tank 10 to keep down cool food and/or drinks the longest time possible. Said advantage is given by the rectangularly-shaped portable cooler.

To facilitate removal and location of the receptacles 7 and the ice tank 10, respective handles 7a and 10a are being provided there.

At the opening, the main body 2 is having a tight-sealing gasket 15 which combined with several tightening seals 16 at the sides is facilitating proper closing of the body 5 with the cover 3, which may have an insulating nature or be simply moulded. Cover 3 comprises a top handle 17 to facilitate handling by the user and at both sides is having respective nesting L-shaped parts 18, wherein the respective suitably-shaped tightening seals 16 fitted at the main body 2 are pressurizedly-mounted, these seals performing a hermetically closing of the cooler 1 by using the tightening-sealing gasket 15 or any other relevant flexible means fitted throughout the profile of the main body 2 opening or of the cover 3 or both.

This invention envisages that the number of receptacles 7 and ice tanks 10 may be any convenient number independently of those illustrated.

Cooler 1 sealing means 16, 18 may be any conventional ones available in the market or any other type.

This invention also envisages that the ice keeping compartments may simply be the spaces available between the receptacles 7 for keeping food and/or drink's which allow the ice arrangement; while liquid defrosting goes through the intermediate drilled plate PF and enters the liquid containing lower tank 12.

Also this invention envisages that the top area ZS has a double section defining an inside top perimetral bracket -non illustrated- allowing the flattened containers R to be resting on the bracket and on the receptacles 7 and/or 10, which may have a height identical to said top bracket.

Figure 4:
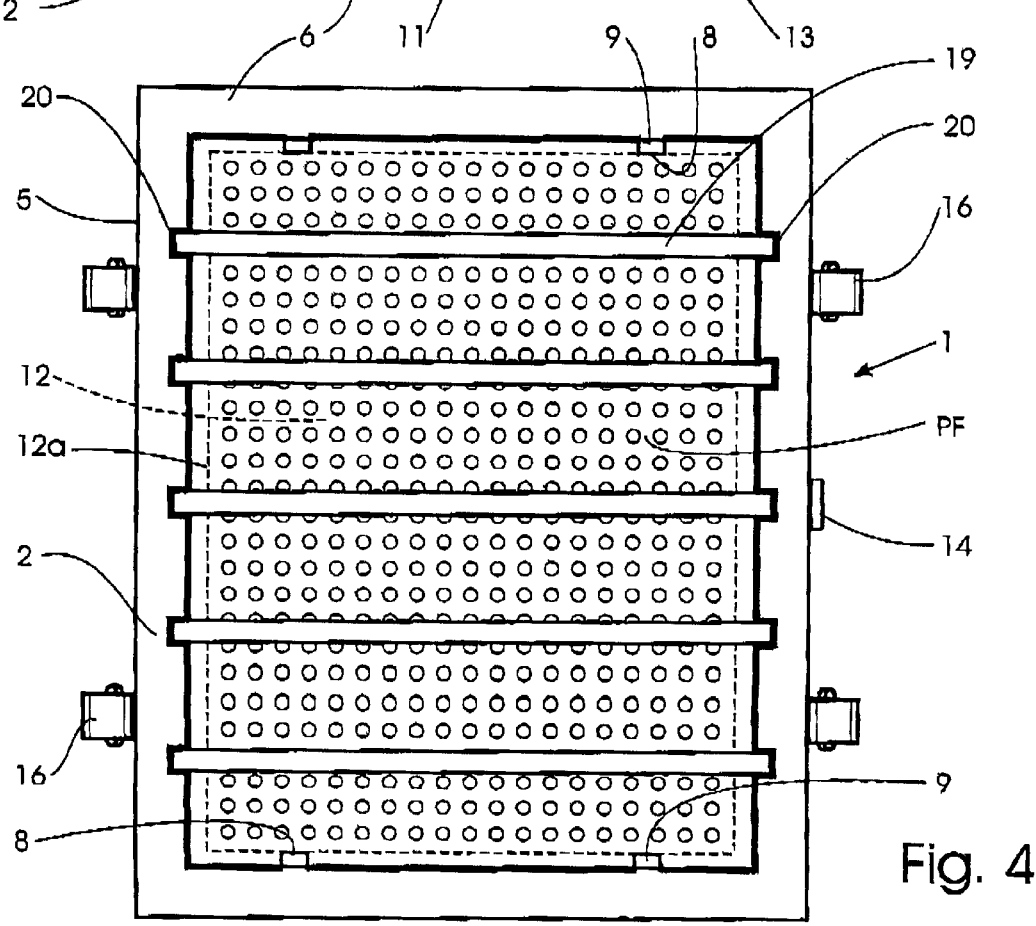
FIG. 4 is a top plan view of an alternate embodiment of the portable cooler according to the present invention.

An alternate embodiment of the present invention is shown in FIG. 4. The embodiment of the present invention shown in FIG. 4. is similar to the embodiment shown in FIG. 1 and 2. However, in lieu of the receptacles 7 and tank 10 as described above, the embodiment shown in FIG. 4 is provided with a plurality of transverse separating components or walls 19. As shown, transverse walls 19 are structured to be slidably inserted with flutes 20 provided on the inner surfaces of opposed walls of the cooler body. In this manner, a wall 19 may be inserted into the cooler by inserting each end thereof into a corresponding flute 20. By inserting a plurality of walls 19 in this manner a plurality of separate compartments can be defined. Once inserted within the cooler the walls 19 rest on top of the drilled plate PF as shown. Thus in the embodiment shown in FIG. 4, the walls 19 act to define a plurality of compartments for storing food and/or drinks and at least one separate compartment for storing ice.

From whatever has been described and by the representation of the drawings, the advantages offered by the portable cooler of this invention are apparent against the prior art embodiments.

The presence of receptacles to keep food and drinks sequenced and separated from the ice shall firstly be emphasized because due to this presence the ice and liquid are never directly in contact with food and drinks.

Further, the fact that the portable cooler is provided with receptacles at the sides is allowing that all the central area lengthwisely throughout is occupied by the ice tank 10 keeping thus regularly cold the food and/or drinks receptacles 7.

In the illustrated embodiment, ice replacement is made at the top area of the portable cooler and nothing of the contents had to be removed or moved at all.

The fact that the lower liquid tank 12 prevents the ice tank 10 might be flooded during ice liquefaction while food and drinks are kept longest in an optimum preservation condition should also be emphasized. Said liquid tank 12 is drained as required by the user simply with the plug 14.

What is claimed is:

1. Portable cooler comprising a food and/or drinks container body and provided with a handle-fitted sealing cover, said body comprising a compartment for arranging food and drinks to contact cooling components to keep them at quite cold temperatures, characterized in that the container body comprises a top area defining a plurality of compartments for keeping food and drinks and the ice, and a lesser-profiled lower area than the top one making up a lower tank for keeping liquid defrosting from ice liquefaction and provided with a draining hole having a sealing plug; said top and lower areas are separated by an intermediate drilled plate resting on the profiled edge projecting from the lower area and upholding food and/or drinks and ice arranged at the top area.

2. Portable cooler, according to claim 1, characterized in that the food and/or drinks keeping compartments are made up with removably and directed receptacles as regards the inside walls of the container body resting on the intermediate drilled plate at the bottom side.

3. Portable cooler according to claim 1, characterized in that the ice keeping compartment are made up with removably tanks arranged between the food and/or drinks keeping receptacles resting on the intermediate drilled plate at the drilling bottom side.

4. Portable cooler according to claim 1, characterized in that the ice keeping compartments are defined by the spaces between the food and/or drinks compartments made up with removably and directed receptacles resting on the inteimediate drilled plate at the bottom side, the ice there resting between said receptacles and the own intermediate drilled plate.

5. Portable cooler according to claim 1, characterized in that the top area of the container body upwardly comprises a double section upwardly defining an inside perimetral bracket which allows that the flattened containers can be rested quite balanced between the receptacles and/or the tank.

6. Portable cooler according to claim 5, characterized in that receptacles and tank are having a height at the same level than the perimetral bracket, which allows that the flattened containers can be rested on the receptacles, tank and bracket.

7. Portable cooler, according to claim 1, characterized in that the plurality of compartments for keeping food and/or drinks and the ice at the top area, are defined by a plurality of removably and separating components arranged between the container body sides, which are positionably to define equal and/or diverse spaces to satisfy any requirements.

* * * * *